July 23, 1940.　　　A. L. PARKER　　　2,209,136
VALVE ASSEMBLY
Filed April 1, 1939　　2 Sheets-Sheet 1
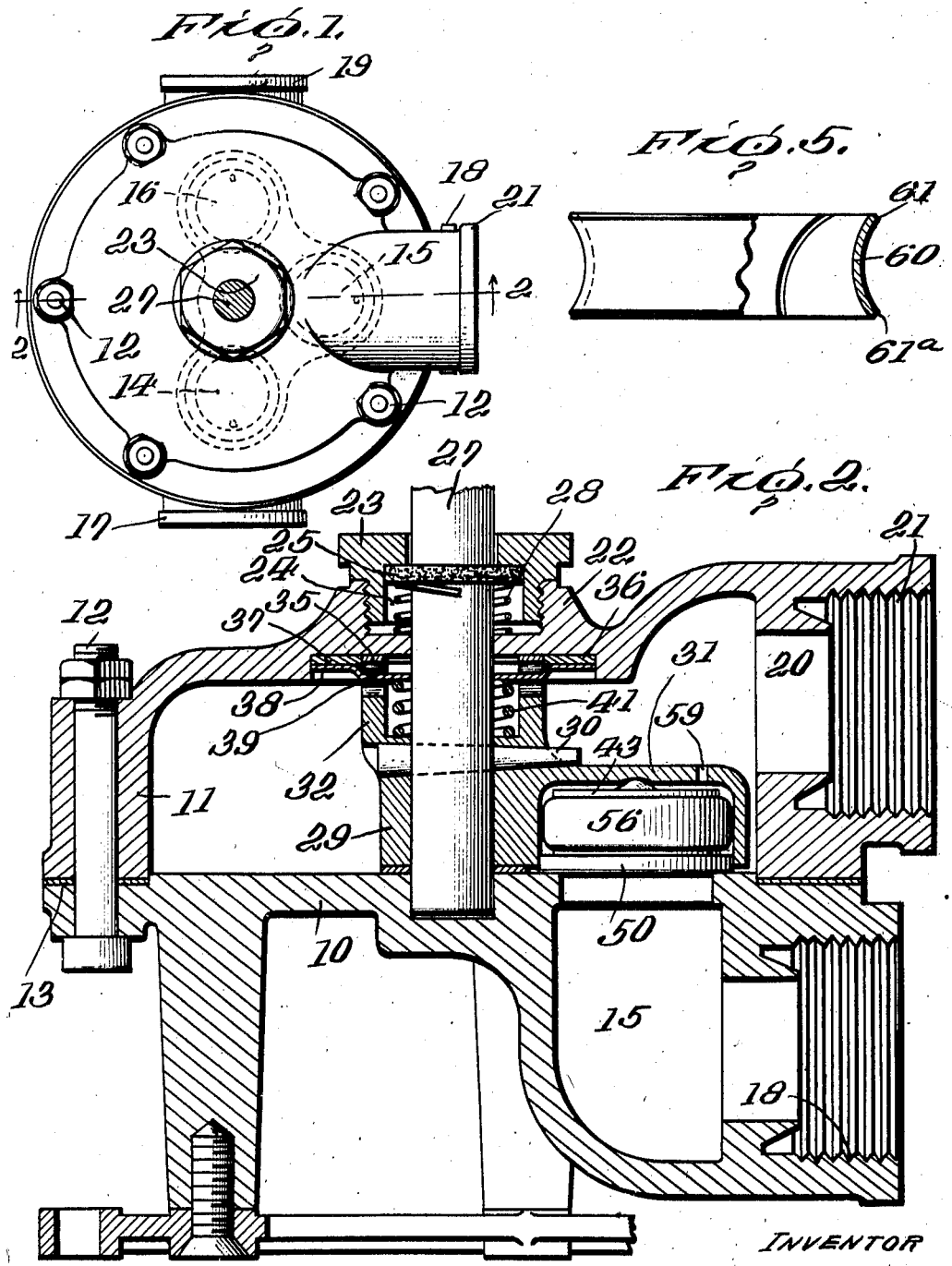
INVENTOR
Arthur L. Parker
By Mason + Porter
ATTORNEYS

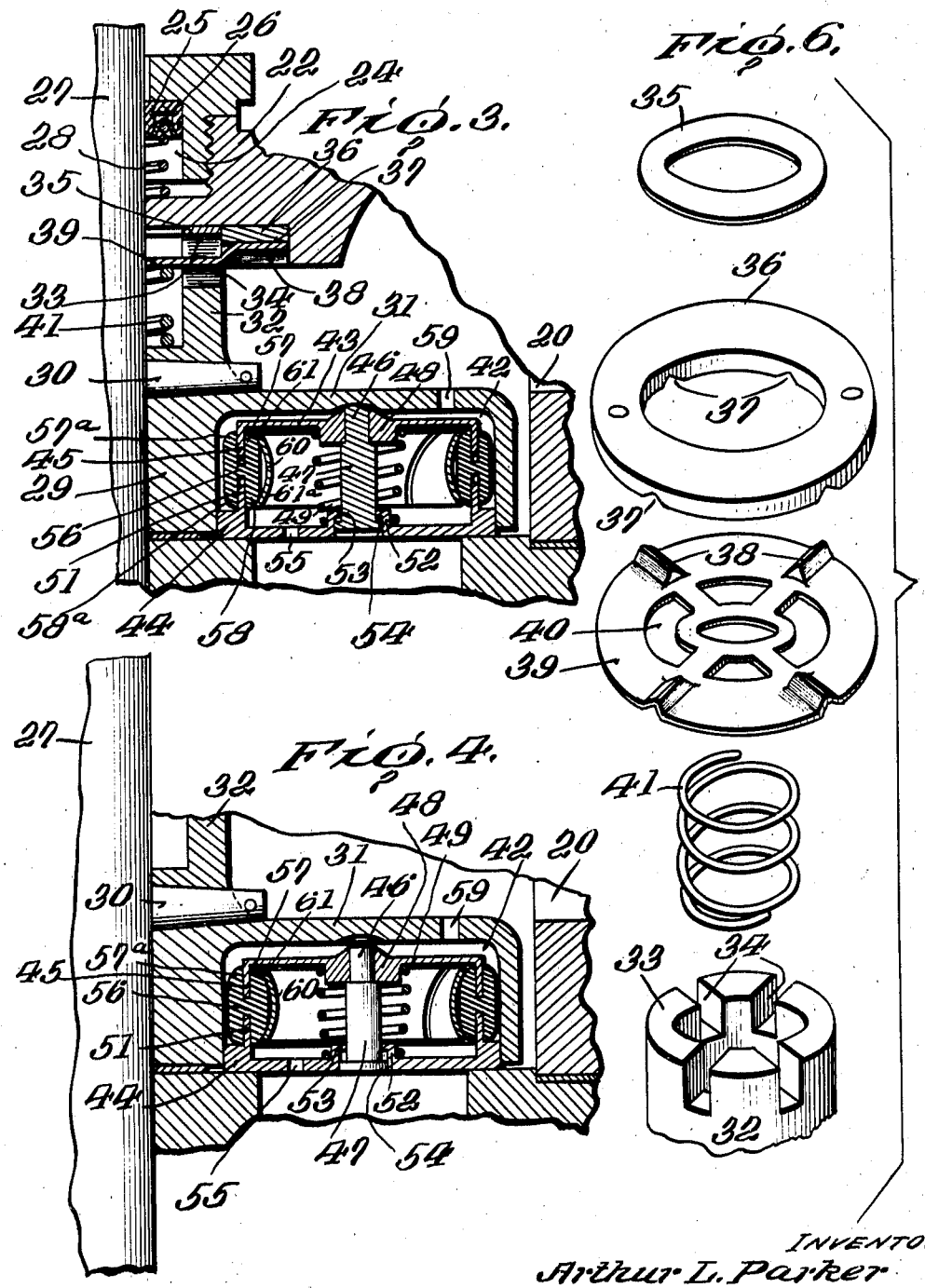

Patented July 23, 1940

2,209,136

UNITED STATES PATENT OFFICE 2,209,136

VALVE ASSEMBLY

Arthur L. Parker, Cleveland, Ohio

Application April 1, 1939, Serial No. 265,569

13 Claims. (Cl. 251—84)

The present invention relates to new and useful improvements in a valve assembly for controlling the passage of fluid, and more particularly to improvements in a valve assembly for selectively controlling the passage of fluid under pressure through a plurality of ports.

The valve assembly of the present invention is of the type which includes a valve casing consisting of a body portion and a chambered cap. The body portion is shaped to provide a flat valve seat having ports opening therethrough, and the cap is also provided with one or more ports. An internal chamber is afforded between the cap and the valve seat and one or more valve members are disposed within this chamber for controlling the passage of fluid between the various ports. A valve operating member is rotatably mounted in the valve casing and a suitable indicator or locating mechanism is provided for properly positioning the valve members so as to control the passage of fluid through the various ports. Each valve member is disposed within a pocket or recess in the valve operating member, and each pocket or recess opens downwardly toward the seating face of the valve body portion so that the valve member is adapted to overlie and close a corresponding port in the valve body portion. Each valve member consists of a pair of relatively movable parts defining an internal chamber and a sealing member is disposed between the adjacent edges of the relatively movable parts so as to prevent leakage of fluid. One of the parts of each valve insert has an aperture communicating with one of the ports in the valve body so that fluid under pressure flowing in one direction is directed within the chamber to exert a seating pressure on the valve insert. Fluid under pressure flowing in the opposite direction may be directed through the valve operating member against the outer surface of the other part of each valve insert so that fluid flowing in this direction will exert a seating pressure on the valve insert.

An object of the present invention is to provide a valve assembly of the above type wherein a valve insert for sealing a port is always maintained in sealing contact with the edge of the port by fluid pressure regardless of the direction of flow of the fluid through the valve assembly.

A further object of the invention is to provide a valve assembly of the above type wherein a sealing member is provided between adjacent edges of the relatively movable parts of each valve insert and wherein this sealing member is constantly maintained in tight sealing engagement with the parts of the valve insert to prevent leakage of fluid therethrough.

A still further object of the invention is to provide a valve assembly of the above type wherein the sealing member between the relatively movable parts of the valve insert is constructed so that it will not interfere with the free relative movement of the parts of the insert.

A still further object of the invention is to provide a valve assembly of the above type wherein an indicator or locating mechanism for positioning the valve operating member in any one of its several positions is constructed and arranged within the valve casing so as not to obstruct the free flow of fluid therethrough.

The invention still further aims to provide a valve assembly of the above type which is of relatively simple construction, which is efficient in use, and which is easily operated notwithstanding the tendency for the fluid under pressure to seat the same.

The above and other objects of the invention will in part be obvious and will be hereinafter more fully pointed out.

In the accompanying drawings:

Figure 1 is a top plan view showing the improved valve assembly.

Figure 2 is an enlarged sectional view taken along the line 2—2 of Figure 1, showing one valve insert seated over a port.

Figure 3 is a further enlarged fragmentary view, in section, showing one of the valve inserts seated by fluid pressure flowing through the port in the valve body.

Figure 4 is a view, similar to Figure 3, but showing the valve insert seated by fluid pressure flowing through the radially extending arm from the chamber within the valve cap.

Figure 5 is a detail view of the expander ring for maintaining the seal between the parts of the valve insert.

Figure 6 is a perspective view, showing the parts of the indicator or locating mechanism separated.

Referring more in detail to the accompanying drawings which illustrate one embodiment of the invention, the valve assembly includes a valve casing having a body portion 10 and a chambered cap 11. The body portion is shaped to provide a flat valve seat and the cap 11 affords an internal chamber within the valve casing. The body portion and the cap are secured together by bolts 12 or the like and a gasket 13 is disposed therebetween for preventing any leakage of fluid. The upper surface of the body portion 10 is shaped to provide a flat valve seating portion and a plurality of ports 14, 15, 16 open upwardly therethrough. These ports communicate with internally threaded coupling members 17, 18, 19, respectively, to which suitable conduits may be attached. The conduits leading from the couplings 17, 18, 19 may be connected to separate fluid supply tanks so that the ports 14, 15, 16 serve as inlet ports or, on the other hand, the conduits may be connected to separate fluid delivery tanks, in which case the ports in the valve body serve as outlet ports. The cap 11 is provided with a port 20 which communicates with an internally threaded coupling member 21, and a suitable conduit may be connected to this coupling member 21 to serve as an inlet or outlet port, depending upon the manner in which the valve assembly is installed.

The top of the cap 11 is provided with an upstanding flange portion 22 which is internally threaded to receive a locking or packing nut 23. The nut 23 is internally recessed as at 24, and a packing washer 25 is disposed therein. This packing washer is substantially U-shaped in cross section and an annular spreader member 26 is employed for maintaining the skirt portions of the washer in tight sealing contact. A valve stem 27 extends through aligned openings in the packing nut 23 and the top of the cap 11 and opens through the recessed portion 24 within the packing nut 23. The washer 25 is held against the packing nut 23 and the valve stem 27 by means of a coil spring 28 which abuts against the spreader member 26 and the top of the cap. This spring 28 is disposed within the recessed portion 24 and cooperates with the spreader member 26 to maintain a fluid tight seal.

The hub portion 29 of a valve operating member is disposed between the cap 11 and the seating surface of the body portion 10 and this hub portion is secured to the valve stem 27 by means of a pin or key 30. Thus, rotation of the valve stem 27 will effect corresponding rotation of the valve operating member. The hub portion 29 is provided with radially extending arms 31, there being three of these arms illustrated. The arms are spaced symmetrically with respect to the ports 14, 15, 16 in the valve body 10. The hub portion 29 is provided with an upstanding annular skirt portion 32 which surrounds the valve stem 27 in spaced relationship so as to provide a space therebetween. The skirt portion 32 is extended upwardly by means of upstanding lugs 33 which are separated by slots 34. The ends of the lugs 33 are adapted to bear against a spacing washer 35 disposed within a recessed or countersunk portion on the inner surface of the top of the valve cap. An annular plate 36 is suitably secured to the inner surface of the countersunk portion of the top of the valve cap 11 outside of the spacing washer 35. This plate 36 is provided with diametrically opposed grooves or slots 37 which are adapted to cooperate with similarly spaced ribs 38 on a ratchet plate 39. The ratchet plate 39 is provided with openings 40 shaped and spaced symmetrically with respect to the lugs 33 on the hub portion 29. The openings 40 are separated by portions of the plate 39. In assembling the valve operating member and the valve stem the lugs 33 on the hub portion 29 are extended through corresponding openings 40 in the ratchet plate 39 so that rotation of the valve operating member will effect corresponding rotation of the ratchet plate 39. A coil spring 41 surrounds the valve stem 27 within the skirt portion 32 on the hub portion 29, and this spring bears against the ratchet plate 39, tending to force the same upwardly so that the ribs 38 will engage corresponding notches 37 in the fixed annular plate 36. The parts of the locating mechanism are thus disposed within the countersunk portion at the top of the valve cap so as not to interfere with the free flow of fluid therethrough. The notches 37 in the plate 36 are disposed so that the ribs 38 on the ratchet plate 39 will engage the same to hold the valve operating member in any one of its several positions.

Each of the radially extending arms 31 on the hub portion 29 is shaped to provide a pocket or recess 42 which opens downwardly toward the seating surface of the valve body 10. These pockets or recesses are of a diameter greater than the diameter of the ports in the valve body and are adapted to house valve inserts or sealing members. These valve inserts or sealing members are identical in construction and the following description of one will serve to describe each of them. Referring more in detail to Figures 3 and 4, each valve insert or sealing member is illustrated as including upper and lower substantially cup-shaped discs 43, 44, respectively. The upper disc 43 includes a depending skirt portion 45 and an end portion which is closed. The end portion is apertured to receive the inwardly offset end 46 of a pin 47 and the end of the pin may be secured in any suitable manner, as by peening to the end portion of the disc 43 so as to afford a fluid tight connection. The end of the pin 47 extends upwardly above the disc 43 and provides an upstanding boss which is adapted to cooperate with a corresponding recess in the under surface of the arm 31. The inner surface of the end of the disc 43 is provided with a depending lug 48 which rests on the shoulder formed between the inwardly offset end 46 and the body portion of the pin 47. This depending lug 48 serves as a locating means for one end of a coil spring 49.

The lower disc 44 includes a sealing portion which is adapted to overlie any one of the ports in the valve body and to seal the same around the edges. This sealing portion is preferably substantially rigid, although there may be a tendency for the same to flex under the action of the seating pressure. However, a lightly flexible form of disc may be employed so that the same will be flexed centrally into a port when closed. The edge 50 of the sealing portion of the disc 44 snugly fits within the inner edge of the pocket or recess formed in the arm 31. The peripheral edge 50 of the disc 44 is provided with an inwardly offset upstanding skirt portion 51 which is in alignment with the depending skirt portion 45 on the disc 43. The sealing portion of the disc 44 is provided with an upstanding collar portion 52, the free edge of which is inwardly turned, as at 53, to surround the body portion of the pin 47 which extends therethrough. The lower end of the pin 47 is provided with a lateral flange 54 which snugly fits within the inner surface of the collar portion 52. At one side of the connection between the pin 47 and the disc 44, there is provided an aperture 55 in the disc 44. This aperture is adapted to communicate with one of the ports in the valve body, depending upon the position of the valve member. The lower end of the spring 49 surrounds the upstanding collar portion 52 and bears against the lower disc 44. The area of the inner surface of the sealing portion of the disc 44 is greater than the area of the outer or under-surface of this sealing portion which receives upward pressure from the fluid in one of the inlet ports so that the fluid pressure within the chamber formed by the discs 43, 44 will exert a downward pressure on the sealing portion of the lower disc. Thus, the spring 49 tends to normally force the discs 43 and 44 away from one another, relative movement between the discs being permitted by the connection between the pin 47 and the lower disc 44.

An annular sealing washer 56 is disposed between the adjacent edges of the skirt portions 45 and 51 on the discs 43 and 44, respectively. The sealing washer is provided with inner and outer lips or skirt portions 57, 57a, respectively, at the upper edge thereof, and with similar depending inner and outer lip or skirt portions 58, 58a at the bottom edge thereof. The upper skirt portions 57, 57a enclose the depending skirt portion 45 on the disc 43. The lower skirt portions 58, 58a enclose the upstanding flange or skirt portion 51 on the disc 44. The sealing washer 56 may be made of any suitable packing material which is somewhat resilient and which is highly resistant to corrosion. The discs 43, 44 and the packing washer 56 thus provide an internal chamber disposed within the pocket in the radial arm 31 of the valve operating member. The discs 43, 44 are permitted slight axial movement relative to one another and the internal chamber is sealed with respect to the pocket in the radial arm. In order to prevent frictional resistance to relative movement between the discs 43, 44, the outer edge of the sealing washer 56 formed by the upper and lower outer skirt portions 57a, 58a is spaced from the adjacent edge of the pocket 42. Thus, relative movement between the discs 43 and 44 is permitted without the outer edge of the sealing washer contacting with the adjacent inner edge of the pocket. Each radial arm on the valve operating member is provided with an aperture 59 which affords communication between the valve chamber within the cap 11 and the pocket or recess in each radial arm.

A split resilient expander ring 60 is disposed within the chamber formed between the discs 43, 44 and this expander ring is shaped to include outwardly curved upper and lower edges 61, 61a, respectively. The upper edge 61 of the expander ring bears against the top edge of the skirt portion 57 on the washer 56 and the lower edge 61a of the expander ring bears against the lower skirt portion 58 on the packing washer. The inherent resiliency of the expander ring tends to maintain the skirt portions 57 and 58 in tight sealing contact with the inner surface of the skirt portions of the upper and lower discs 43, 44, respectively.

When the ports 14, 15, 16 in the valve body 10 serve as inlet ports, that is, when the coupling members for these ports are connected by conduit means to separate fluid supply tanks, and when all of these ports are closed by the valve inserts, fluid under pressure will be directed through the aperture 55 in each disc 44 and into the chamber provided by the discs 43, 44 and the sealing washer 56. In this position of the valve operating member, the discs 43, 44 are separated, as shown in Figure 3, with the end of the pin 47 bearing against the inner surface of the arm 31. In this same position, the skirt portions 45, 51 on the discs may be slightly removed from the transverse portion of the sealing washer 56. This relative movement of the discs 43, 44 is effected by the pressure of the fluid within the internal chamber between the discs and is augmented by the spring 49. Thus, any increased fluid pressure in the inlet ports will effect a correspondingly increased seating or sealing pressure on the lower disc 44. Thus, the lower disc is maintained in tight sealing engagement with the edge of the corresponding inlet port by the pressure of the fluid in the inlet port. Similarly, the inner skirt portions 57, 58 of the sealing washer 56 are maintained in tight sealing engagement with the skirt portions on the discs by the fluid pressure and also by the action of the expander ring 60.

When it is desired to pass fluid outwardly through port 20 in the chamber cap 11, it is simply necessary to manipulate the valve stem 57 so as to shift the valve operating member and the valve inserts which are carried by the radial arms 31 to a proper position to afford communication between one of the inlet ports and the outlet port through the chamber provided in the valve casing.

If, in such a position of the valve with one of the inlet ports in communication with the outlet port 20, another of the closed inlet ports is connected to an empty supply tank, the fluid under pressure passing through the chamber between the cap and the valve body will gain access to the pocket or recess 42 in the radial arm 31 over the port leading to the empty tank. This fluid under pressure gains access to the particular pocket through the aperture 59 in the corresponding radial arm. As shown in Figure 4, the fluid under pressure passing into the pocket 42 will exert a downward pressure on the upper disc 43 and cause the same to move downwardly against the action of the spring 49. Thus, the packing washer 56 will be compressed between the edges of the skirt portions on the upper and lower discs and the lower disc 44 will be maintained seated. This compression of the packing washer 56 by movement of the disc 43 downwardly toward the disc 44 is effected without frictional resistance between the washer and the inner surface of the pocket 42 because of the spacing of these parts which permits a slight expansion. This relative movement between the upper and lower discs effects a compression of the spring 49 so that this increased spring pressure is also utilized to firmly seat the lower disc 44 so as to guard against the possibility of any fluid leaking into the port which leads to the empty tank. In any position of the valve insert, the packing washer 56 will prevent leakage of the fluid between the pocket 42 and the chamber formed between the discs.

As pointed out above, the valve assembly may be installed with the port 20 of the cap 11 serving as the inlet port and with the ports 14, 15, 16 in the valve body 10 serving as the outlet ports. When the valve assembly is installed in this manner, fluid under pressure flowing into the valve casing through the port 20 will pass through the aperture 59 in the radial arms 31 to exert a seating pressure on the lower disc 44 in the manner pointed out above. There is thus provided a valve assembly which may be installed in various positions and wherein the desired ports are sealed under influence of pressure under all conditions of use to which the valve assembly may be put. Furthermore, it will be seen that the spacing of the washer 56 from the adjacent edge of the pocket 42 in each radial arm permits the fluid under pressure to be rapidly transmitted to the surface of the peripheral edge of the lower disc 49, thus exerting a seating pressure thereon in addition to the seating pressure exerted by the downward movement of the upper disc 43.

The cap 11 may be completely closed by omitting the port 20 therein. In such a construction, fluid may be selectively controlled in its passage through the ports in the valve body by an appropriate spacing or placing of the radial arm 31 on the valve operating member.

From the foregoing description it will be seen that the present invention provides an improved valve assembly for selectively controlling the passage of fluid between various ports. The assembly may be installed and used with a single inlet port serving a plurality of outlet ports, or it may be installed and be used with a plurality of inlet ports serving a single outlet port. In all conditions of installation, the valve assembly is one wherein the pressure of the fluid is at all times utilized to exert a seating pressure on the valve inserts or sealing members, thus assuring that there will be no leakage of fluid. This fluid seating pressure is also augmented by a spring seating pressure. The fluid seal provided by the washer between the upper and lower discs is aided by the pressure of the fluid and also by the action of the expander ring disposed between the upper and lower discs of each valve insert. The construction and spacing of the packing washer with respect to the pocket in each radial arm is such that frictional resistance between these parts is prevented, thus facilitating efficient and rapid operation of the valve. The spacing of the washer from the side of the pocket in each radial arm also permits the free rotation of each valve insert when the valve operating member is turned from one position to another. This rotation of the valve inserts during manipulation of the valve operating member serves to evenly distribute the wear and also to prevent the accumulation of any foreign matter on the valve seat. The indicator or locating mechanism formed by the notched plate 36 and the ratchet plate 39 serves as a convenient means for properly locating the valve operating member in any one of several positions. The construction of the indicator mechanism is such that it will not impede the free flow of fluid through the valve casing.

While one form of valve assembly has been shown in the accompanying drawings for purposes of illustration, it is to be clearly understood that various changes in the details of construction and arrangement of parts may be made without departing from the scope of the invention as set forth in the appended claims.

I claim:

1. A valve assembly for controlling the passage of fluid under pressure, comprising a valve casing having a port therethrough, a valve member movable within said casing and having one face thereof adapted to overlie the port for closing the same, said valve member including a plurality of relatively movable parts defining a chamber therebetween, sealing means between said relatively movable parts for closing the chamber, means disposed within the chamber for exerting a sealing pressure on said sealing means, and means for utilizing fluid under pressure regardless of the direction of flow of the fluid through the port in the valve casing to exert a seating pressure on the valve member when the port is closed.

2. A valve assembly for controlling the passage of fluid under pressure, comprising a valve casing having a port therethrough, a valve operating member, a valve insert movable with said operating member and having one face thereof adapted to overlie the port for closing the same, said valve insert including a plurality of relatively movable parts defining a chamber therebetween, sealing means between said relatively movable parts for closing the chamber, means disposed within the chamber for exerting a sealing pressure on said sealing means, and means for utilizing fluid under pressure regardless of the direction of flow of the fluid through the port in the valve casing to exert a seating pressure on the valve insert when the port is closed.

3. A valve assembly for controlling the passage of fluid under pressure, comprising a valve casing having a port therethrough, a valve operating member, a valve insert movable with said operating member and having one face thereof adapted to overlie the port for closing the same, said valve insert including a plurality of relatively movable parts defining a chamber therebetween, one of said parts having an aperture permitting the passage therethrough of fluid under pressure flowing in one direction into the chamber whereby the fluid under pressure is utilized to exert a seating pressure on the apertured part of the valve insert, sealing means between said relatively movable parts for closing the chamber, means disposed within the chamber for exerting a sealing pressure on said sealing means, and means for directing fluid under pressure flowing in the opposite direction against another of the parts of said valve insert for exerting a seating pressure thereon.

4. A valve assembly for controlling the passage of fluid under pressure, comprising a valve casing having a port therethrough, a valve operating member mounted within said casing and having a pocket opening downwardly and adapted to overlie the port when closed, a valve insert disposed within said pocket and movable therewith and adapted to overlie the port for closing the same, said valve insert including a plurality of relatively movable parts defining a chamber therebetween and one of said parts having an aperture therethrough for directing fluid under pressure flowing in one direction against the valve insert to exert a seating pressure thereon, sealing means between said relatively movable parts for closing the chamber, means disposed within the chamber for exerting a sealing pressure on said sealing means, and means including a passage extending into said pocket for directing fluid flowing in the opposite direction against the valve insert to exert a seating pressure thereon.

5. A valve assembly for controlling the passage of fluid under pressure, comprising a valve casing having a port therethrough, a valve member movable within said casing and having one face thereof adapted to overlie the port for closing the same, said valve member including a plurality of relatively movable parts defining a chamber therebetween, sealing means between said relatively movable parts for closing the chamber, spring means disposed within the chamber for exerting a sealing pressure on said sealing means, and means for utilizing fluid under pressure regardless of the direction of flow of the fluid through the port in the valve casing to exert a seating pressure on the valve member when the port is closed.

6. A valve assembly for controlling the passage of fluid under pressure, comprising a valve casing having a port therethrough, a valve member movable within said casing and having one face thereof adapted to overlie the port for closing the same, said valve member including a plurality of relatively movable parts defining a chamber therebetween, sealing means between said relatively movable parts for closing the chamber, an expander ring disposed within the chamber and bearing against said sealing means for exerting a sealing pressure thereon, and means for utilizing fluid under pressure regardless of the direction of flow of the fluid through the port in the valve casing to exert a seating pressure on the valve member when the port is closed.

7. A valve assembly for controlling the passage of fluid under pressure, comprising a valve casing having a port therethrough, a valve member movable within said casing and having one face thereof adapted to overlie the port for closing the same, said valve member including a plurality of relatively movable parts defining a chamber therebetween, sealing means between said relatively movable parts for closing the chamber, an expander ring disposed within the chamber and having outwardly curved edges bearing against the upper and lower edges of said sealing means for exerting a sealing pressure thereon, and means for utilizing fluid under pressure regardless of the direction of flow of the fluid through the port in the valve casing to exert a seating pressure on the valve member when the port is closed.

8. A valve assembly for controlling the passage of fluid under pressure, comprising a valve casing having a port therethrough, a valve member movable within said casing and having one face thereof adapted to overlie the port for closing the same, said valve member including a plurality of relatively movable parts defining a chamber therebetween, a sealing gasket disposed between the edges of said relatively movable parts and having portions thereof overlying said relatively movable parts, an expander ring disposed within the chamber and having the edges thereof bearing against the overlying portions of said gasket for exerting a sealing pressure thereon, and means for utilizing fluid under pressure regardless of the direction of the flow of the fluid through the port in the valve casing to exert a seating pressure on the valve member when the port is closed.

9. A valve assembly for controlling the passage of fluid under pressure, comprising a valve casing having a port therethrough, a valve member movable within said casing and having one face thereof adapted to overlie the port for closing the same, said valve member including a pair of relatively movable parts defining a chamber therebetween and having skirt portions extending toward one another, a sealing gasket disposed between the skirt portions of said relatively movable parts and having portions thereof overlying the inner and outer surfaces of the said skirt portions for closing the chamber, an expander ring disposed within the chamber and having outwardly directed edges bearing against the overlying portions of said gasket within the chamber for exerting a sealing pressure thereon, and means for utilizing fluid under pressure regardless of the direction of the flow of the fluid through the port in the valve casing to exert a seating pressure on the valve member when the port is closed.

10. A valve assembly for controlling the passage of fluid under pressure, comprising a valve casing having a port therethrough, a valve operating member mounted within said casing and having a pocket opening downwardly and adapted to overlie the port when closed, a valve insert disposed within said pocket and movable therewith and adapted to overlie the port for closing the same, said valve insert including a pair of relatively movable parts defining a chamber therebetween and having skirt portions directed toward each other, a sealing gasket disposed between the skirt portions of said relatively movable parts and having portions thereof overlying the inner and outer surfaces of the said skirt portions for closing the chamber, the outer surface of said sealing gasket being spaced from the adjacent inner surface of said pocket whereby to facilitate relative movement between said parts, means disposed within the chamber for exerting a sealing pressure on said gasket, one of said parts having an aperture therethrough for directing fluid under pressure flowing in one direction against the valve insert to exert a seating pressure thereon, and means including a passage extending into said pocket for directing fluid flowing in the opposite direction against the valve insert to exert a seating pressure thereon.

11. A valve assembly for controlling the passage of fluid under pressure, comprising a valve casing having a port therethrough, a valve member movable within said casing and having one face thereof adapted to overlie the port for closing the same, said valve member including a plurality of relatively movable parts defining a chamber therebetween, sealing means between said relatively movable parts for closing the chamber, an expander ring disposed within the chamber and bearing against said sealing means for exerting a sealing pressure thereon, spring means tending to normally separate said relatively movable parts and disposed within said expander ring inside the chamber, and means for utilizing fluid under pressure regardless of the direction of flow of the fluid through the valve casing to exert a seating pressure on the valve member when the port is closed.

12. A valve assembly for controlling the passage of fluid under pressure, comprising a valve casing having a port therethrough, a valve operating member mounted within said casing and having a radial arm shaped to provide a pocket opening downwardly and adapted to overlie the port when closed, valve means disposed within said pocket and movable with said valve operating member, said valve means including a pair of relatively movable parts and sealing means between said parts for providing a closed chamber therebetween, means disposed within the chamber and bearing against said sealing means for exerting a seating pressure thereon, spring means for separating said relatively movable parts, one of said parts adapted to overlie the port for closing the same and having an aperture therethrough for directing fluid under pressure flowing in one direction into the chamber for exerting a seating pressure against one of the parts of said valve means, and a passage extending through said radial arm into said pocket for directing fluid under pressure flowing in the opposite direction into said pocket and against the other part of said valve means for exerting a seating pressure thereon.

13. A valve assembly for controlling the passage of fluid under pressure, comprising a valve body having a plurality of ports therethrough, a chambered cap securing said valve body and having a port therethrough, a valve operating member mounted within said cap and having a plurality of radial arms spaced symmetrically with respect to the ports in said valve body, each of said radial arms being shaped to provide a pocket opening downwardly and adapted to overlie a corresponding port in said valve body when the port is closed, a valve insert disposed within each of said pockets and movable with said valve operating member, each of said valve inserts including a pair of relatively movable parts one of which is adapted to overlie a corresponding port in said valve body for closing the same, sealing means between said relatively movable parts for closing the chamber formed therebetween, means disposed within each chamber and bearing against said sealing means for exerting a sealing pressure thereon, and means for utilizing fluid under pressure regardless of the direction of flow of the fluid through the ports to exert a seating pressure on said valve inserts, said means including a passage through each of said radial arms for directing fluid under pressure against said valve inserts when the fluid is flowing in one direction and an aperture associated with each of said valve inserts for directing fluid under pressure from the ports in said valve body against said valve inserts when the fluid is flowing in the opposite direction.

ARTHUR L. PARKER.